United States Patent [19]
Jain et al.

[11] Patent Number: 6,077,488
[45] Date of Patent: Jun. 20, 2000

[54] METHOD AND APPARATUS FOR PRODUCING CLEAN DRY AIR HAVING APPLICATION TO AIR SEPARATION

[75] Inventors: Ravi Jain, Bridgewater; James K. Tseng, Berkeley Heights, both of N.J.

[73] Assignee: The BOC Group, Inc., New Providence, N.J.

[21] Appl. No.: 09/044,408

[22] Filed: Mar. 19, 1998

[51] Int. Cl.⁷ .......................... B01D 53/047; B01D 53/23
[52] U.S. Cl. ...................... 423/210; 423/230; 423/245.3; 423/247; 423/248; 423/351; 423/579; 95/117; 95/139
[58] Field of Search ...................... 95/139, 117; 423/210, 423/230, 245.3, 247, 248, 351, 579

[56] References Cited

U.S. PATENT DOCUMENTS

| | | | |
|---|---|---|---|
| 5,202,096 | 4/1993 | Jain | 422/190 |
| 5,560,763 | 10/1996 | Kumar | 95/98 |
| 5,571,309 | 11/1996 | Kumar | 95/99 |

FOREIGN PATENT DOCUMENTS

| | | | |
|---|---|---|---|
| 54-103777 | 8/1979 | Japan | 95/139 |
| 1115784 | 9/1984 | U.S.S.R. | 95/139 |

*Primary Examiner*—Steven P. Griffin
*Assistant Examiner*—Timothy C Vanoy
*Attorney, Agent, or Firm*—Salvatore P. Pace

[57] ABSTRACT

A method and apparatus for producing a clean dry air product stream. In accordance with the method and apparatus, a compressed feed air stream is introduced into one adsorption bed to adsorb moisture and carbon dioxide and to produce a first intermediate product stream. Impurities contained within the first intermediate product stream such as hydrocarbons, carbon monoxide and hydrogen are catalytically reacted to produce a second intermediate product stream that contains additional carbon dioxide and moisture produced from the catalytic reaction. The second intermediate product stream is introduced into another adsorption bed that adsorbs the additional moisture and carbon dioxide formed by the catalytic reaction to produce the clean dry air product stream. The present invention can be used alone to serve the need of supplying a clean dry air product stream. Additionally, it can be used as a prepurification unit of an air separation plant designed to produce an ultra-high purity industrial gas product. By catalytically reacting the hydrocarbons in the first intermediate product stream, less expensive oil lubricated compression equipment can be used to compress the feed air.

11 Claims, 2 Drawing Sheets

METHOD AND APPARATUS FOR PRODUCING CLEAN DRY AIR HAVING APPLICATION TO AIR SEPARATION

BACKGROUND OF THE INVENTION

The present invention relates to a method and apparatus for producing clean dry air in which compressed air is fed to an adsorption bed system to remove impurities such as moisture and carbon dioxide. More particularly, the present invention relates to such a method and apparatus in which the feed air, after having been purified in the adsorption bed system, is introduced into a catalytic reactor to react hydrocarbons, carbon monoxide and hydrogen contained within the feed to produce additional moisture and carbon dioxide that is also adsorbed by the adsorption unit to produce the clean dry air product. In another aspect, the present invention relates to such a method and apparatus in which the clean dry air product is introduced into a cryogenic rectification process to produce one or more products of nitrogen or oxygen.

Clean dry air has many uses in the modem electronics industry. For instance, in production facilities, an atmospheric environment is required that is devoid of moisture and other impurities such as hydrocarbons, hydrogen and carbon monoxide that can detrimentally effect semiconductor production. When clean dry air is provided, filtering and drying units are used in combination with oil-free pumps. This apparatus is expensive and must be continually monitored.

Another use of clean dry air is in the production of ultra-high purity industrial gases that are in the main also used in semiconductor fabrication facilities. The clean dry air for such purposes is cooled to near dew point temperatures and then introduced into a cryogenic rectification column to produce the ultra-high purity industrial gas products such as nitrogen.

In any air separation process, it is necessary to remove impurities such as carbon dioxide and moisture from the feed air in that such impurities tend to freeze out during the low temperature process. The net effect of freezing out the impurities can be to cause stoppage of piping systems and conduits and to concentrate dangerous hydrocarbons. In ultra-high purity air separation processes adsorption systems are used in which the feed air is prepurified by adsorption units that are also designed to remove carbon monoxide and hydrogen. A stream lean in heavy impurities is produced and remaining light impurities are stripped from such stream to produce a product.

It is to be noted that hydrocarbons exist in the air in trace amounts. However, when oil lubricated machinery, such as air compressors, are used in connection with air separation, oil vapor is produced that acts as a source of hydrocarbons introduced into the feed air. Such a level of hydrocarbons would be unacceptable in a clean dry air product or a compressed feed to an air separation plant designed to produce an ultra-high purity product. Therefore, when clean dry air is required, expensive oil-free compressors are used.

As will be discussed, the present invention provides a method and apparatus for manufacturing clean dry air that can use conventional adsorbent beds and also, conventional compressors to produce a clean dry air product that contains no more than 100 parts per billion each of hydrocarbons and moisture. Furthermore, the methodology and apparatus at the present invention have particular application to prepurification units used in air separation plants to allow for production of ultra-high purity industrial gas products.

SUMMARY OF THE INVENTION

In one aspect, a method of making a clean dry air product stream is provided. In accordance with the method, a compressed feed air stream is introduced into a first adsorption bed that is configured to adsorb moisture and carbon dioxide to produce a first intermediate product stream. Hydrocarbons, carbon monoxide and hydrogen contained within at least part of the first intermediate product stream are catalytically reacted to produce a second intermediate product stream containing additional carbon dioxide and moisture produced from the catalytic reaction. The second intermediate product stream is introduced into a second adsorption bed configured to adsorb the additional moisture and carbon dioxide, thereby to produce the clean dry air product stream.

In another aspect, the present invention relates to a method of separating air. In accordance with this method, a compressed feed air stream is introduced into each of a plurality of adsorption beds configured to adsorb carbon dioxide and moisture and operating in an out of phase cycle in which each of the adsorbent beds serves as an on-line bed and then as a regenerating bed for regeneration purposes. While as an on-line bed, moisture and carbon dioxide are adsorbed from the compressed feed air stream, thereby to produce a first intermediate product stream. The on-line bed is then brought off-line to serve as a regenerating bed that is regenerated. The bed is brought on-line again to adsorb the additional moisture and carbon dioxide contained within the second intermediate product stream, prior to its service in adsorbing moisture and carbon dioxide from the compressed feed air stream, thereby to produce a clean dry air product stream.

Hydrocarbons, carbon monoxide and hydrogen contained within at least part of the first intermediate product stream are catalytically reacted to produce a second intermediate product stream containing the additional carbon dioxide and moisture produced from the catalytic reaction. The second intermediate product stream is introduced into the on-line bed prior to the introduction of the compressed feed air. At least part of the clean dry air product stream is introduced into a cryogenic rectification process having at least one distillation column that is configured to separate the air contained within the clean dry air product stream and thereby to produce at least one product stream enriched in nitrogen or oxygen.

In yet another aspect, the present invention provides an apparatus for producing a clean dry air product stream. In accordance with this aspect of the present invention, first and second adsorption beds are provided that are each configured to adsorb moisture and carbon dioxide. A compressor is provided to compress air to produce a compressed feed air stream. An aftercooler is connected to the compressor to remove heat of compression from the compressed feed air stream. A water separator is connected to the aftercooler to remove any condensed water from the compressed feed air stream. The first adsorption bed is connected to the water separator to receive the compressed feed air stream, thereby to adsorb the moisture and carbon dioxide from the compressed feed air stream and thereby to also produce the first intermediate product stream.

A catalytic reactor is provided in communication with the first adsorption bed. The catalytic reactor has a catalyst to catalytically react hydrocarbons, carbon monoxide, and hydrogen contained within at least part of the first intermediate product stream to produce a second intermediate product stream. The second intermediate product stream contains additional carbon dioxide and moisture from the catalytic reaction. A countercurrent heat exchanger is positioned to partially heat the first intermediate product stream and to cool the second intermediate product stream. A make up heat exchanger is interposed between the catalytic reactor and the heat exchanger to fully heat the first intermediate product stream to a temperature suitable for conducting the catalytic reaction. The second adsorption bed is connected to the heat exchanger to receive the second intermediate product stream. As a result, the additional moisture and carbon dioxide is adsorbed and the clean dry air product stream is thereby produced.

As can be seen from the above discussion, compressed feed air is introduced into an adsorption bed while on-line to initially adsorb carbon dioxide and moisture contained within the feed air. The resultant intermediate product stream produced by adsorption of the carbon dioxide and moisture still has unacceptable levels of hydrocarbons, carbon monoxide and hydrogen. In fact as stated above, the present invention allows the use of less expensive oil lubricated compression equipment so that the hydrocarbon level in an air feed of the present invention is particularly unacceptable.

Preferably, the adsorbent beds also contain an adsorbent selected to adsorb catalyst poisons such as $NO_x$ and $SO_x$. Although such poisons are not always present in every application of the present invention, it is to be noted that the removal of the catalyst poisons before the catalytic oxidation step significantly improves the catalyst life, performance and therefore, the efficiency of the process. It is to be noted, that the present invention will nevertheless work without catalyst poison removal, even when such poisons are present, albeit with the deficiencies outlines above. A further point is that some of the oil vapors may be removed in such beds.

In accordance with the invention, the resultant first intermediate product stream that has been initially cleansed of moisture and carbon dioxide is then heated and catalytically reacted in a catalytic reactor to produce the additional moisture and carbon dioxide. The moisture and carbon dioxide are then adsorbed in another of the adsorbent beds to produce the clean dry air product. Additionally, if such clean dry air product is rectified, an ultra-high purity nitrogen or oxygen product can be produced which is suitable for use in providing the industrial gas requirements for semiconductor manufacturing facilities.

BRIEF DESCRIPTION OF THE DRAWINGS

While the specification concludes with claims distinctly pointing out the subject the application regards as his invention, it is believed that the invention will be better understood when taken in connection with the accompanying drawings in which:

DETAILED DESCRIPTION

Figure 1:
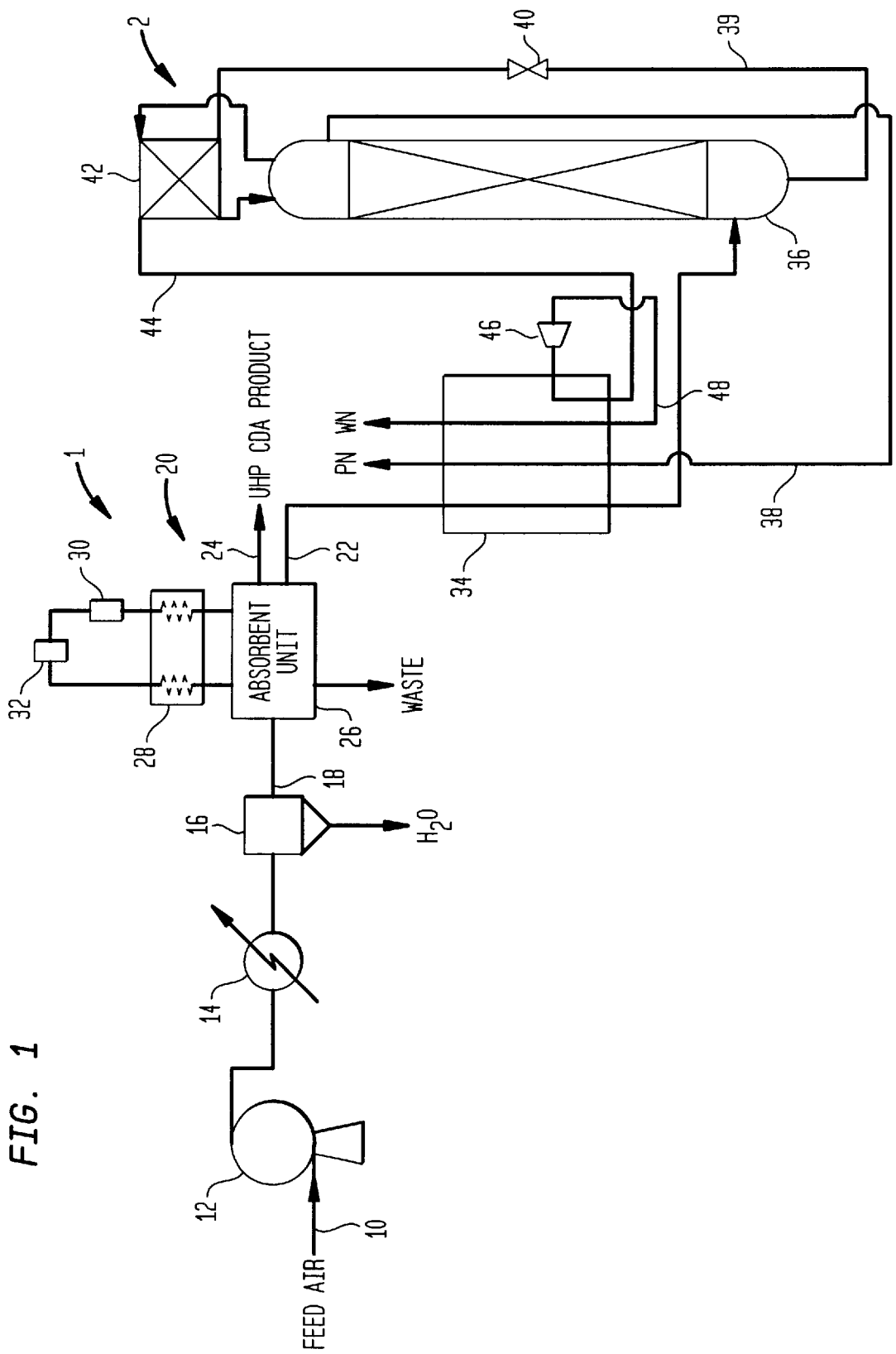
FIG. 1 is a schematic view of an apparatus and method for producing a clean dry air product applied to separation of air to produce a nitrogen product.

With reference to FIG. 1, a clean dry air apparatus 1 in accordance with the present invention is illustrated as applied to an air separation unit 2 to produce ultra-high purity nitrogen product.

A feed air stream 10 is compressed by a compressor 12. Thereafter, the heat of compression is removed by way of an aftercooler 14. Any condensed moisture is also removed by a moisture separator 16 to produce a compressed feed air stream 18. Compressed feed air stream 18 is then purified in a clean dry air unit 20 in accordance with the present invention to produce a compressed and purified air stream 22 and an ultra-high purity dry air product 24 which can be separately utilized. Clean dry air unit 20 consists of an adsorbent unit 26, a countercurrent heat exchanger 28, a make up heater 30, and a catalytic reactor 32. Catalytic reactor 32 can be a bed containing a platinum group catalyst or a metal oxide catalyst designed to function in a range of between about 250° C. and about 500° C. Preferred catalysts include palladium or platinum supported on activated alumina and an oxide catalyst containing a mixture of manganese and copper oxide.

Air separation unit 2 is provided with a main heat exchanger 34 in which compressed and purified air stream 22 is cooled to at or near dew point temperatures and is introduced into a distillation column 36. Distillation column 36 contains a sufficient height of packing trays to produce a nitrogen product stream 38 which fully warms to atmosphere temperature within the main heat exchanger 34 where it can be withdrawn as a product nitrogen, labeled "PN". In this regard, distillation column 36 can be designed in a known manner to produce an ultra-high purity nitrogen product can be approximately 99.999% pure and contain no more than about 0.1 ppm of oxygen, carbon monoxide, hydrogen, and hydrocarbons and etc. The column bottoms produced by distillation column 36 is removed as an oxygen enriched stream 39. Oxygen enriched stream 39 is expanded by an expansion valve 40 and then vaporized within a head condenser 42 that is used in creating reflux for distillation column 36. The resultant vaporized coolant stream 44 is then cooled to an intermediate temperature between the warm and cold ends of the main heat exchanger 34 and is expanded within a turboexpander 46. Turboexpander 46 is connected to an energy dissipative device such as an oil brake or an electrical generator. This produces refrigeration as a refrigerant stream 48 that is introduced into the cold end main heat exchanger 34 and after having been fully warmed to ambient temperatures, is discharged as waste nitrogen labeled "WN". This waste stream can be used for the regeneration of the adsorbent beds.

Although air separation unit 2 has been illustrated as a single column nitrogen generator, it is understood that the present invention is not intended to be limited to such specific embodiment. The present invention would have equal application to a double column plant in which higher and lower pressure columns were operatively associated with one another in a heat transfer relationship to produce an ultra-high purity oxygen product. Moreover, an ultra-high purity oxygen column, connected to the illustrated nitrogen column, would be within the ambit of the present invention.

Figure 2:
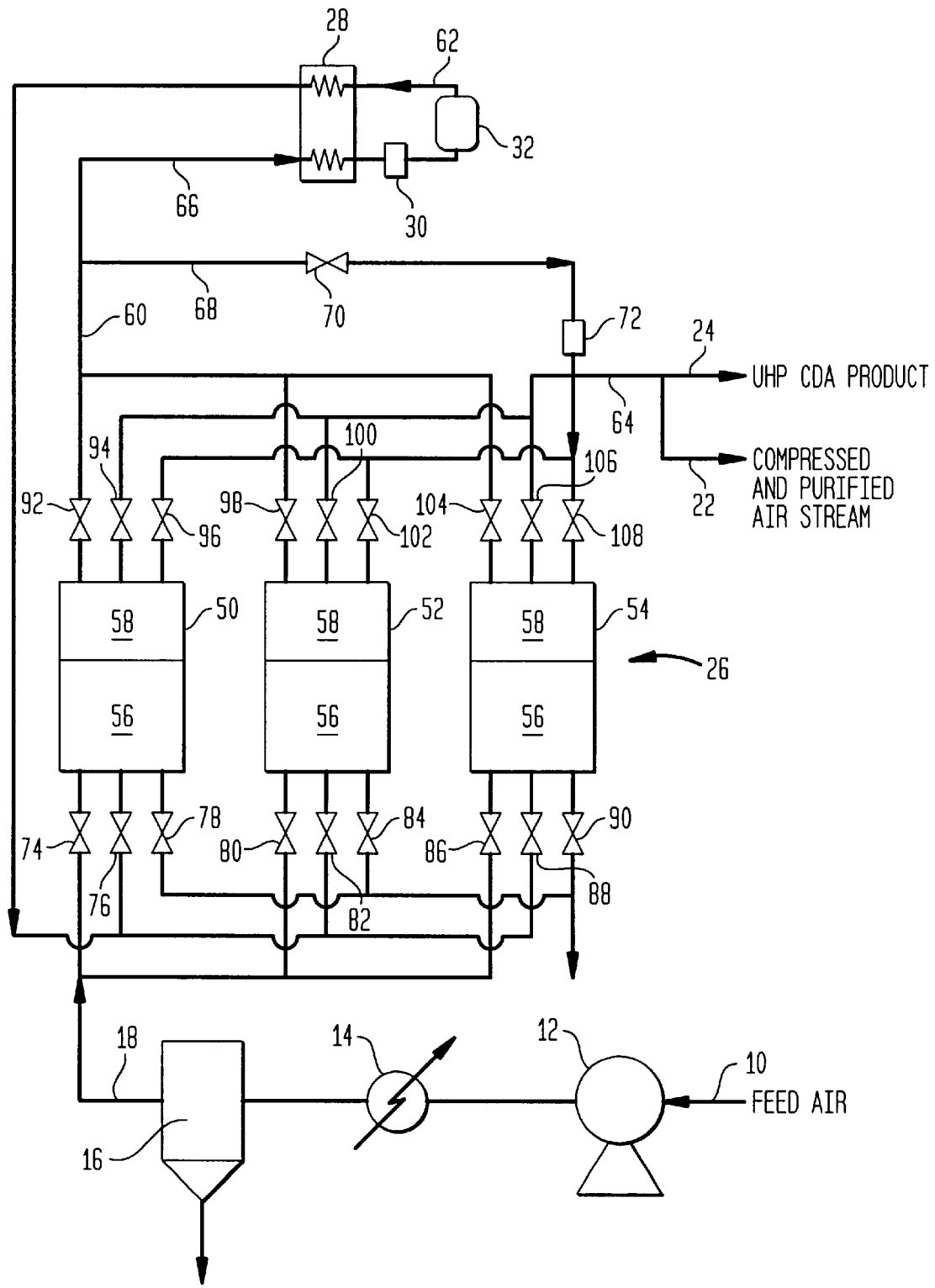
FIG. 2 is a schematic view of an apparatus in accordance with the present invention for producing an ultra-high purity clean dry air product.

With reference to FIG. 2, adsorption unit 26 is illustrated as containing three adsorbent beds 50, 52 and 54. Adsorbent beds 50, 52, and 54 are designed to adsorb carbon dioxide and moisture from feed air stream 18 as well as $SO_x$ and $NO_x$. The adsorbent beds also adsorb some of the oil vapor contained in the feed air. Each of the adsorbent beds 50, 52, and 54, is provided with a layer 56 which could be activated alumina or silica gel for moisture removal. A top layer 58 is provided to adsorb carbon dioxide and some hydrocarbons. To this end, top layer 58 can be a type 13X or 5A zeolite. Some hydrocarbons produced from the oil vapor given off by oil lubricated compressors are also removed by the activated alumina or silica gel. The $SO_x$ and $NO_x$ compounds are primarily removed by the zeolite layer. Hydrocarbons exiting the top layer 58 would comprise methane, ethane and possibly some propane.

Adsorbent beds 50, 52 and 54 are preferably operated in accordance with an out of phase cycle where each of the beds is either on-line performing an adsorption function or off-line and being regenerated as a regenerating bed. The preferred cycle is a temperature swing adsorption cycle in which beds are regenerated by known steps of depressurization, heating, cooling, purging and repressurization.

When each of adsorbent beds 50, 52 and 54 is on-line, the compressed feed air stream 18 passes through adsorbent beds 50, 52 and 54 to produce a first intermediate product stream 60 which is warmed within a countercurrent heat exchanger 28 and then heated to reaction temperature within make up heater 30. The first intermediate product stream 60 is passed through catalytic reactor 32 to produce a second subsidiary air stream 62 which is introduced into a bed that has just been regenerated to produce a clean dry air product stream 64.

As illustrated in FIG. 2, only a part 66 of the first intermediate product stream 60 is actually processed within catalytic reactor 32 and a remaining part 68 of first intermediate product stream is used in regenerating adsorbent beds 50, 52 and 54. Again, if a cryogenic distillation system is used to separate some of the clean dry air, the waste stream produced from such a system could also be used for bed regeneration.

The following chart illustrates the operation of adsorption unit 26. It is to be noted that in steps that are labeled "adsorb UHP air", the air within second intermediate process stream 62 is adsorbed in adsorbent beds 50, 52 and 54. Similarly, in steps labeled, "adsorb feed air" means that feed air from feed air stream 18 is being adsorbed in beds 50, 52 and 54 to produce first intermediate product stream 60. Lastly, regeneration steps, which will be discussed in more detail, are labeled "depressurized", "heat", "cool", "purge", "repressurize". Heating and cooling steps can be carried out with part of first intermediate product stream 60. The purge and the repressurization steps can be carried out with clean dry air product stream 64.

| Step #/Step Time min | Bed 50 | Bed 52 | Bed 54 |
| --- | --- | --- | --- |
| Step 1/5 | Adsorb UHP air | Depressurize | Adsorb feed air |
| Step 2/210 | Adsorb UHP air | Heat | Adsorb feed air |
| Step 3/120 | Adsorb UHP air | Cool | Adsorb feed air |
| Step 4/10 | Adsorb UHP air | Purge | Adsorb feed air |
| Step 5/15 | Adsorb UHP air | Repressurize | Adsorb feed air |
| Step 6/5 | Adsorb feed air | Adsorb UHP air | Depressurize |
| Step 7/210 | Adsorb feed air | Adsorb UHP air | Heat |
| Step 8/120 | Adsorb feed air | Adsorb UHP air | Cool |
| Step 9/10 | Adsorb feed air | Adsorb UHP air | Purge |
| Step 10/15 | Adsorb feed air | Adsorb UHP air | Repressurize |
| Step 11/5 | Depressurize | Adsorb feed air | Adsorb UHP air |
| Step 12/210 | Heat | Adsorb feed air | Adsorb UHP air |
| Step 13/120 | Cool | Adsorb feed air | Adsorb UHP air |
| Step 14/10 | Purge | Adsorb feed air | Adsorb UHP air |
| Step 15/15 | Repressurize | Adsorb feed air | Adsorb UHP air |

With reference to the chart, in steps 1 through 5, adsorbent beds 50 and 54 are on-line with bed 50 producing clean dry air product stream 64 from second intermediate product stream 62 and adsorbent bed 54 is producing first intermediate product stream 60. Adsorbent bed 52 is undergoing regeneration. To this end, valves 86 and 104 are set in open positions to allow bed 54 to produce first intermediate product stream 60 and valves 76 and 94 are open to permit bed 50 to produce the clean dry air product stream 64. Thereafter in steps 6 through 10, valves 74 and 92 are open so that adsorbent bed 50 produces first intermediate product stream 60 and valves 82 and 100 are open so that adsorbent bed 52 produces clean dry air product stream 64. At this point adsorbent bed 54 is regenerated. Thereafter in steps 11 through 15, adsorbent bed 50 is regenerated, adsorbent bed 52 adsorbs carbon dioxide and moisture from compressed feed air stream 18 to produce first intermediate product stream 60. To this end, now valves 80 and 98 are open. Adsorbent bed 54 having just been regenerated now functions to adsorb the additional carbon dioxide and moisture in second intermediate product stream 62 and thus produces clean dry air product stream 64. In order for adsorbent bed 54 to function in this manner, valves 88 and 106 are set in open positions. The cycle is continuous so that steps 1 through 15 are repeated continuously.

It is to be noted that a typical make-up for the feed air stream 18 contains between about 1 and about 5 ppm carbon monoxide, between about 1 and about 5 ppm hydrogen, between about 1 and about 50 ppm total hydrocarbons, between about 350 and about 400 ppm carbon dioxide and water saturated. The adsorbent beds 50, 52, and 54 and the cycle is designed so that first intermediate product stream 60 can contain about 1 and about 5 ppm carbon monoxide, between about 1 and about 5 ppm hydrogen, less than about 10 ppm total hydrocarbons, and less than 1 ppm each of carbon dioxide and water. Clean dry air product stream 64 can have a make-up of less than 1 ppm each of carbon monoxide, hydrogen, carbon dioxide, hydrocarbons and water.

Turning again to steps 1 through 5 and the regeneration process, adsorbent bed 52 is depressurized by opening valve 84. Thereafter, adsorbent bed 52 is heated by opening valve 102 so that it now receives the remaining part 68 of first intermediate product stream 60, heated by heater 72. With valve 102 set in the same position, adsorbent bed 52 is cooled by simply turning off heater 72. Adsorbent bed 52 is then purged with the remaining part of clean dry air product stream 64 by now opening valve 100 and closing valve 102. Pressurization occurs by closing valve 84.

In steps 6 through 11, it is now adsorbent bed 54 that is regenerated and as such valve 90 is opened. Thereafter, in order to heat adsorbent bed 54 with remaining part 68 of first intermediate product stream 60, valve 108 is set in an open position. With valve 108 set in the same position, heater 72 is turned off. Thereafter, valve 108 is closed and valve 106 is open to allow for a purge with a remaining part of dry air product stream 64. With valve 106 set in the same position, valve 90 is then closed to allow for repressurization of bed 54 back to operating pressure.

With respect to regeneration of adsorbent bed 50 in steps 11 through 15, valve 78 is open. Thereafter, adsorbent bed 50 is heated by opening valve 92 and is then cooled by turning off heater 72 with the valves in the same position. Thereafter, valve 92 is closed and valve 94 is open to allow for a purge with remaining part of clean dry air product stream 64. With the valves set in the same position, valve 78 is closed to repressurize bed 50.

The cycle occurs continuously from bed to bed with each bed continuously first adsorbing ultra-high purity air, then adsorbing feed air and then being regenerated. Although not illustrated, the above sequence would preferably be automated by the use of remotely controlled, pneumatic valves operated by a programmable logic controller or like device.

As can be appreciated by those skilled in the art, the present invention has equal applicability to different types of adsorption systems. For instance, although a temperature swing adsorption system is illustrated, the present invention would have applicability to a pressure swing adsorption system. Although three beds are shown, it is possible to carry out the present invention with as few as two beds in which case the process of adsorption and desorption would be discontinuous. However, such discontinuity could be alleviated by providing a surge tank or product pressure tank to retain the product during regeneration of the beds.

While the present invention has been described to preferred embodiment, as will occur to those skilled in the art, numerous changes, additions and omissions may be made without departing from the spirit and scope of the present invention.

We claim:

1. A method of making a clean dry air product stream, said method comprising:

introducing a compressed feed air stream into an adsorption unit to adsorb moisture and carbon dioxide to produce a first intermediate product stream;

heating at least part of said first intermediate product stream to a temperature suitable for the catalytic reaction of hydrocarbons, carbon monoxide and hydrogen into carbon dioxide and moisture;

catalytically reacting hydrocarbons, carbon monoxide, and hydrogen contained within said at least part of said first intermediate product stream to produce a second intermediate product stream containing additional carbon dioxide and moisture produced from said catalytic reaction;

cooling said second intermediate product stream; and after cooling said second intermediate product stream, introducing said second intermediate product stream back into said adsorption unit to adsorb said additional moisture and carbon dioxide, to produce said clean dry air product stream.

2. The method of claim 1, wherein the catalyst used to catalytically react the hydrocarbons, carbon monoxide and hydrogen contained in said at least part of said first intermediate product stream is a platinum group catalyst or a metal oxide catalyst.

3. The method of claim 2, wherein said at least part of said first intermediate product stream is heated and said second intermediate product stream is cooled by countercurrently exchanging heat in a heat exchanger between said at least part of said first intermediate product stream and said second intermediate product stream, thereby to cool said second intermediate product stream and to partially heat said at least part of said first intermediate product stream.

4. The method of claim 3, wherein said at least part of said first intermediate product stream is then fully heated to a temperature necessary for the catalytic reaction by passing said at least part of said first intermediate product stream through a makeup heater which is located between the catalytic reactor and said heat exchanger.

5. The method of claim 1, wherein the adsorption unit comprises three adsorption beds connected to each other in a parallel arrangement, wherein each of the three adsorption beds cyclically treats, in a swing bed process, the compressed feed air to adsorb water and carbon dioxide out of the feed air and to produce said first intermediate product stream while another second, bed adsorbs carbon dioxide and water from the second intermediate product stream to produce the ultra-high purity air and the other, third bed is being regenerated.

6. The method of claim 5, wherein:

the regeneration is a temperature swing adsorption process in which each of the first, second, and third adsorption beds during regeneration is subjected to depressurization, heating, cooling, purging and repressurization steps;

the heating step comprises heating part of said intermediate product stream and introducing said part into the bed being regenerated;

said cooling step comprises introducing another part of said intermediate product stream into the heated bed;

said purging step comprises passing part of said clean dry air product stream through the cooled bed; and said repressurization step comprises introducing said part of said clean dry air product stream into the purged bed until the purged bed reaches an operating pressure suitable for adsorbing the carbon dioxide and water in the second intermediate product stream.

7. A method of separating air, comprising:

introducing a compressed feed air stream into an adsorption unit comprising three adsorption beds connected to each other in a parallel arrangement, wherein each of the three adsorption beds cyclically treats in a swing bed process the compressed feed air to adsorb the water and carbon dioxide out of the feed air and to produce a first intermediate product stream while another, second bed adsorbs carbon dioxide and water from a second intermediate product stream to produce the ultra-high purity air and the other, third bed is being regenerated;

heating at least part of said first intermediate product stream to a temperature suitable for the catalytic reaction of hydrocarbons, carbon monoxide and hydrogen to produce carbon dioxide and water;

passing the heated first intermediate product stream into a catalytic reactor and converting the hydrocarbons, hydrogen and carbon monoxide into carbon dioxide and water to produce a second intermediate product stream comprising carbon dioxide and water;

cooling the second intermediate product stream;

introducing the second intermediate product stream into the adsorption unit and removing the carbon dioxide and water out of the second intermediate product stream to produce a clean dry air product stream;

introducing part of the clean dry air product stream into a cryogenic rectification process comprising at least one distillation column thereby producing at least one product enriched in oxygen or nitrogen.

8. The method of claim 7, wherein:

the regeneration is a temperature swing adsorption process in which each of the adsorption beds during regeneration is subjected to depressurization, heating, cooling, purging and repressurization steps;

the heating step comprises heating a part of said first intermediate product stream and introducing the heated part into the bed being regenerated;

said cooling step comprises introducing another part of said first intermediate product stream into the heated bed;

said purging step comprises passing part of said clean dry air product stream through the cooled bed; and said repressurization step comprises introducing said part of said clean dry air product stream into the purged bed until the purged bed reaches an operating pressure suitable for adsorbing the carbon dioxide and water in the second intermediate product stream.

9. The method of claim 7, wherein said at least part of said first intermediate product stream is catalytically reacted within a catalytic reactor containing a platinum group catalyst or a metal oxide catalyst to catalytically react said hydrocarbons, carbon monoxide and hydrogen.

10. The method of claim 5 or claim 7, wherein each of said adsorbent beds has first and second layers in which the first layer is activated alumina or silica gel to remove said water and said second layer is a 13X Zeolite or a 5A Zeolite.

11. The method of claim 7, wherein said catalytic reaction uses a catalyst selected from a platinum group catalyst or a metal oxide catalyst.

* * * * *